United States Patent [19]

Terada

[11] Patent Number: 5,772,547

[45] Date of Patent: Jun. 30, 1998

[54] BICYCLE CRANKSET

[75] Inventor: Masao Terada, Osaka, Japan

[73] Assignee: Shimano, Inc., Osaka, Japan

[21] Appl. No.: 705,866

[22] Filed: Aug. 28, 1996

[30] Foreign Application Priority Data

Sep. 20, 1995 [JP] Japan .................................. 7-242004

[51] Int. Cl.$^6$ ....................................................... F16H 9/06
[52] U.S. Cl. .............................................. 474/77; 474/78
[58] Field of Search .......................... 474/77, 78, 80–82; 24/594.2

[56] References Cited

U.S. PATENT DOCUMENTS

| 4,331,043 | 5/1982 | Shimano | 74/594.2 |
| 4,380,445 | 4/1983 | Shimano | 474/144 |
| 4,869,709 | 9/1989 | Nagano | 74/594.2 X |
| 4,916,974 | 4/1990 | Kozakae et al. | 74/594.2 X |
| 5,062,318 | 11/1991 | Yamazaki | 74/594.2 |
| 5,067,370 | 11/1991 | Lemmens | 74/594.2 |
| 5,213,550 | 5/1993 | Wu | 474/160 |
| 5,246,402 | 9/1993 | Romano | 474/78 |
| 5,314,366 | 5/1994 | Palm | 474/160 X |
| 5,426,997 | 6/1995 | Brion | 74/594.1 |
| 5,480,359 | 1/1996 | Tani | 474/160 |

OTHER PUBLICATIONS

European search report for EP 96306658.4, dated Jul. 2, 1997.

*Primary Examiner*—Roger J. Schoeppel
*Attorney, Agent, or Firm*—James A. Deland

[57] ABSTRACT

A bicycle crankset for mounting a plurality of chainrings includes a crank arm having a first end for mounting a pedal and a second end having a boss for mounting to a crank axle, a chainring retainer for supporting at least one of the plurality of chainrings, and a reinforcement member. The chainring retainer has a first engagement member for engaging the boss, and the reinforcement member includes a second engagement member for engaging the boss. The chainring retainer includes a first center ring defining the first engagement member and a plurality of first arms extending radially outwardly from the first center ring. Similarly, the reinforcement member includes a second center ring defining the second engagement member and a plurality of second arms extending radially outwardly from the second center ring. The distal ends of the plurality of first arms may be connected to corresponding distal ends of the plurality of second arms. Alternatively, the chainring retainer may have a first peripheral ring disposed at distal ends of the plurality of first arms, and the reinforcement member may have a second peripheral ring disposed at distal ends of the plurality of second arms. The first peripheral ring may be secured to the second peripheral ring over a part or whole circumference thereof. To provide good balance of the crankset, the plurality of first arms may be offset from the plurality of second arms by a half-pitch in the circumferential direction.

21 Claims, 8 Drawing Sheets

BICYCLE CRANKSET

BACKGROUND OF THE INVENTION

The present invention is directed to a bicycle crankset and, more particularly, to a bicycle crankset which eliminates cantilever coupling of the chainrings to the crank arm.

Road racing bikes and mountain bikes utilize cranksets that accommodate a plurality of chainrings in order to obtain optimum gear ratios for a diversity of riding conditions. Bicycles equipped with these types of cranksets are employed primarily for bicycle competitions such as road and off-road races, and there is thus a demand for lightweight materials that maintain strength and rigidity. For this reason, light alloys such as aluminum alloys have been the primary materials of cranksets.

A typical crankset is equipped with a crank arm that can retain a pedal at its distal end and that has a cylindrical boss member formed on its basal end for mounting it onto the crank axle. A cantilever-configured chainring retainer member radiates out in a star-shape from the crank arm and is integrally formed with the boss member, for example by forging. The cantilever design of the chainring retainer necessitates a certain degree of thickness in order to maintain rigidity and strength, and this thwarts attempts to further lighten the weight of the crankset.

SUMMARY OF THE INVENTION

The present invention is directed to a bicycle crankset which eliminates the cantilever coupling of the chainrings to the crank arm in a manner that allows the crankset to have a lighter weight than conventional cranksets. In one embodiment of the present invention, a bicycle crankset for mounting a plurality of chainrings includes a crank arm having a first end for mounting a pedal and a second end having a boss for mounting to a crank axle, a chainring retainer for supporting at least one of the plurality of chainwheels, and a reinforcement member. The chainring retainer has a first engagement member for engaging the boss, and the reinforcement member includes a second engagement member for engaging the boss. The reinforcement member has a section fastened to the chainring retainer, and at least a portion of the reinforcement member is spaced apart from the chainring retainer. If desired, the chain retainer and the reinforcement member may each have a plate shape.

In a more specific embodiment, the chainring retainer includes a first center ring having the first engagement member and a plurality of first arms extending radially outwardly from the first center ring. Similarly, the reinforcement member may include a second center ring having the second engagement member and a plurality of second arms extending radially outwardly from the second center ring. The distal ends of the plurality of first arms may then be connected to corresponding distal ends of the plurality of second arms. Alternatively, the chainring retainer may have a first peripheral ring disposed at distal ends of the plurality of first arms, and the reinforcement member may have a second peripheral ring disposed at distal ends of the plurality of second arms. The first peripheral ring may be secured to the second peripheral ring over a part or whole circumference thereof. To provide good balance of the crankset, the plurality of first arms may be offset from the plurality of second arms by, for example, a half-pitch in the circumferential direction.

A crankset having this type of configuration allows chainrings to be mounted by means of the chainring retainer member, achieves strength and rigidity due to the provision of a reinforcement member fastened to the peripheral edge of the chainring retainer member, and achieves a lighter weight by means of the thin shapes of the chainring retainer and reinforcement member. Further reductions in weight can be achieved by configuring the members from synthetic resins or fiber-reinforced resins (FRP or CFRP), which are lighter in weight than metals.

DETAILED DESCRIPTION OF THE EMBODIMENTS

Figure 1:
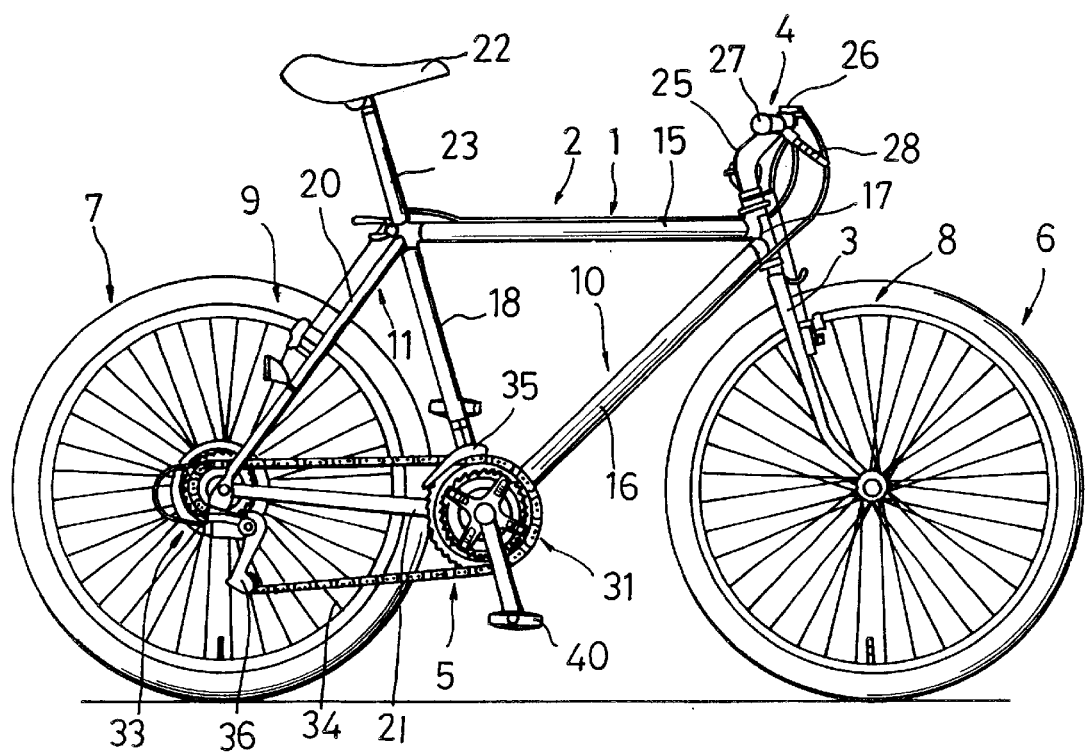
FIG. 1 is a side view of a mountain bicycle employing a particular embodiment of a crankset according to the present invention.

FIG. 1 shows a bicycle that employs a frame-fork assembly having a diamond type frame 1. The frame 1 is provided with a frame body 2 that is of TIG-welded construction, for example, using an aluminum tube. A front fork 3 is rotatably supported by the front member of the frame body 2 around an inclined vertical axis. The bicycle is equipped with a handle member 4 connected to the front fork 3, a drive member 5 that is connected to the bottom of the frame 2 and that converts pedaling force into drive force, a front wheel 6 rotatably supported at the bottom ends of the front fork 3, a rear wheel 7 rotatably supported at the rear end of the frame body 2, and fornt and rear braking devices 8 and 9.

Figure 3:
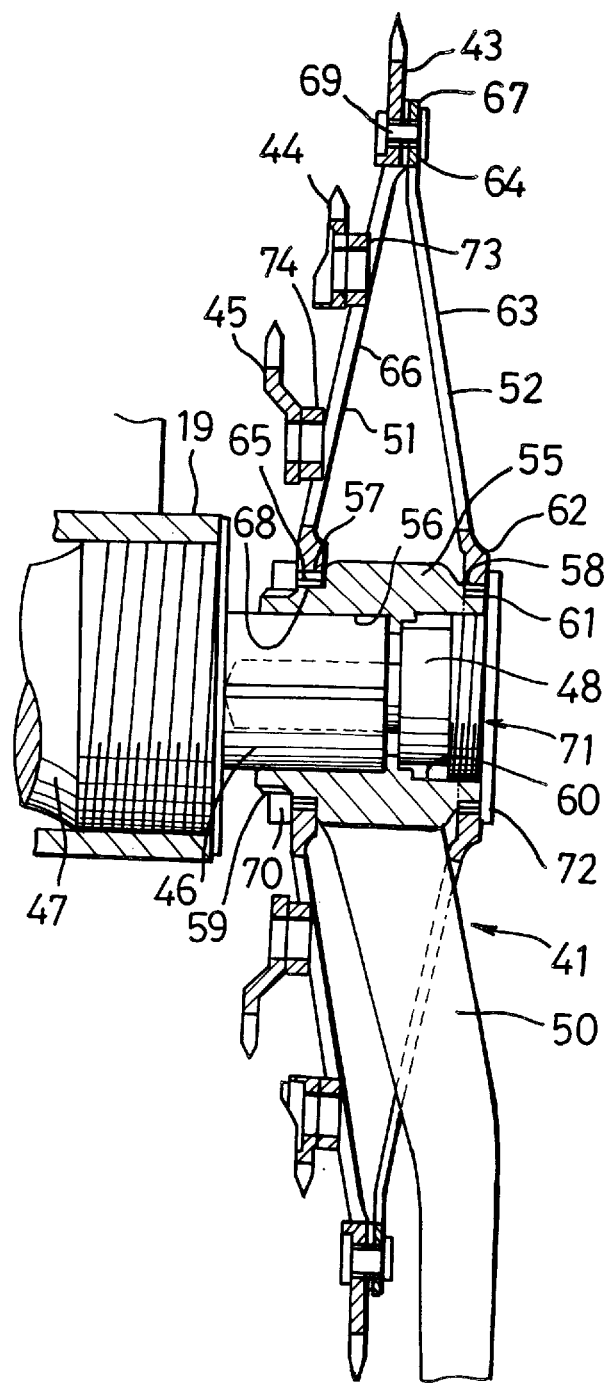
FIG. 3 is a side cross sectional view of the crankset shown in FIG. 2.

The frame body 2 is equipped with a front triangle 10 and a rear triangle 11 located behind the front triangle 10. The front triangle 10 comprises an upper tube 15 set horizontally, a lower tube 16 set below the upper tube 15 and inclined upwards towards the front, a head tube 17 connecting the forward ends of the upper tube 15 and the lower tube 16, and a seat tube 18 that extends upward at an incline and that connects the back ends of the upper tube 15 and the lower tube 16. A seat post 23 to which a saddle 22 is attached is mounted in a vertically adjustable manner on the seat tube 18. In the connecting portion between the seat tube 18 and the lower tube 16 is a bottom bracket shell 19 (FIG. 3). The rear triangle 11 comprises a back fork 20 that extends backwards at an incline and whose forward end is connected to the seat tube 18, and a chainstay 21 that extend towards the rear from the seat tube 18 and which is connected to the back ends of the back fork 20.

The upper section of the forward fork 3 is equipped with a handle stem 25 that is fastened in a vertically movable manner, and a handlebar 26 extending to the left and right is fastened to the upper end of the handle stem 25. Grips 27 are fitted onto the exterior perimeter of both ends of the handlebar 26. Brake levers 28 with shift levers are installed towards the inside of these grips 27.

Figure 2:
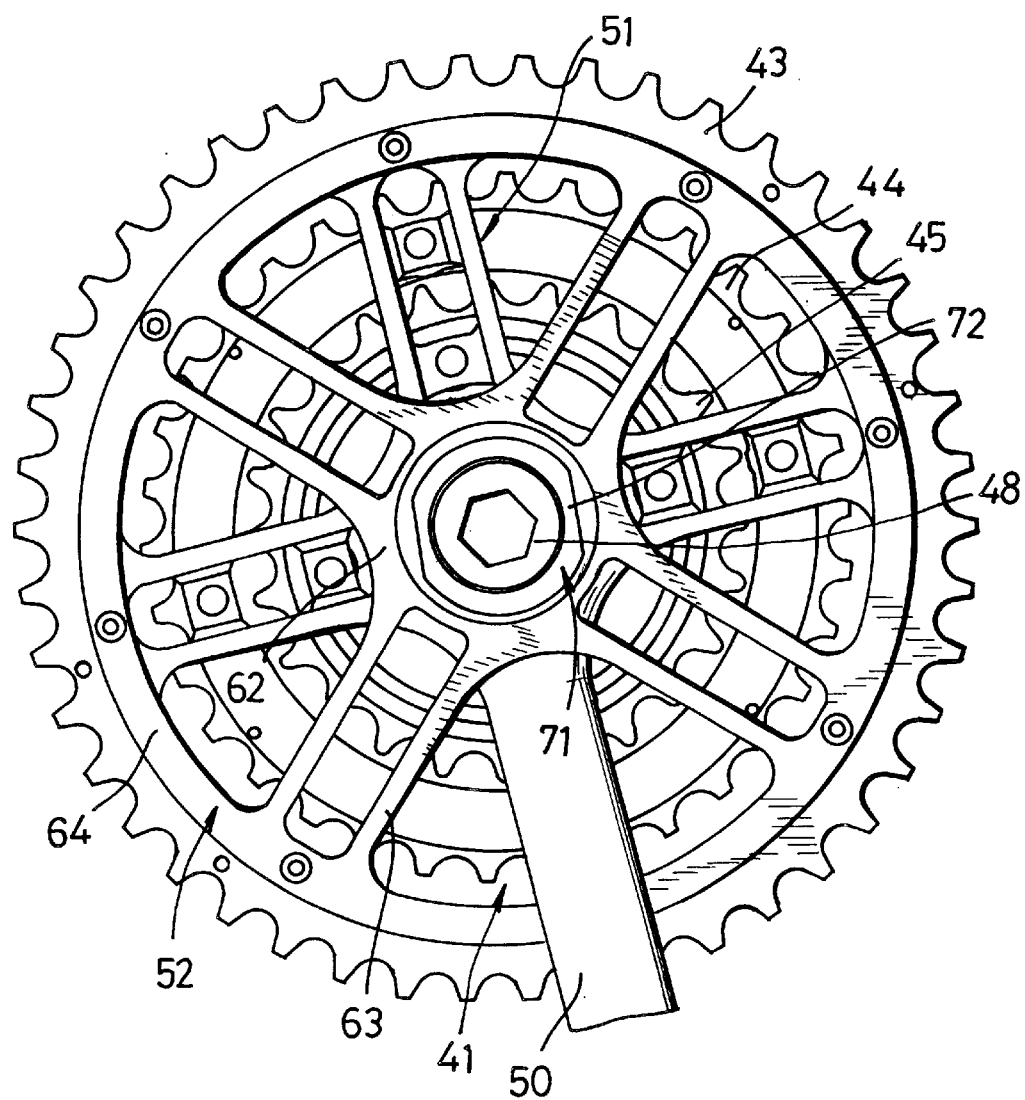
FIG. 2 is a front view of a particular embodiment of a bicycle crankset according to the present invention.

The drive member 5 is equipped with a crankset member 31 that is installed on the bottom bracket shell 19, a cog member 33 mounted in a nonrotating manner to a free hub of a rear wheel 7, a chain 34 that is engaged by and moved between the crankset 31 and the cog member 33, a front derailleur 35, and a rear derailleur 36. As shown in FIGS. 2 and 3, the crankset 31 is equipped with a left crank (not illustrated) and a right crank 41 with a pedal 40 (FIG. 1) attached to its distal end; an outer chainring 43, a middle chainring 44, and an inner chainring 45 concentrically mounted on the right crank 41; a crank axle 46 attached to each of the two cranks at either end; and a bottom bracket 47 that rotatably supports the crank axle 46. The bottom bracket 47 is a cartridge type and is installed on a bottom bracket shell 19. In this embodiment, the outer chainring 43, the middle chainring 44, and the inner chainring 45 are ring-shape members whose radii decrease in this order. Chainring teeth 42T, 32T, and 22T are formed thereon respectively.

The right crank 41 is fastened to the crank axle 46 by means of a hexagonal bolt 48 inserted into the basal end thereof. The right crank 41 is equipped with a crank arm 50, a chainring retainer plate 51 attached to the basal end of the crank arm 50, and a reinforcement plate 52 for reinforcing the chainring retainer plate 51.

Figure 5:
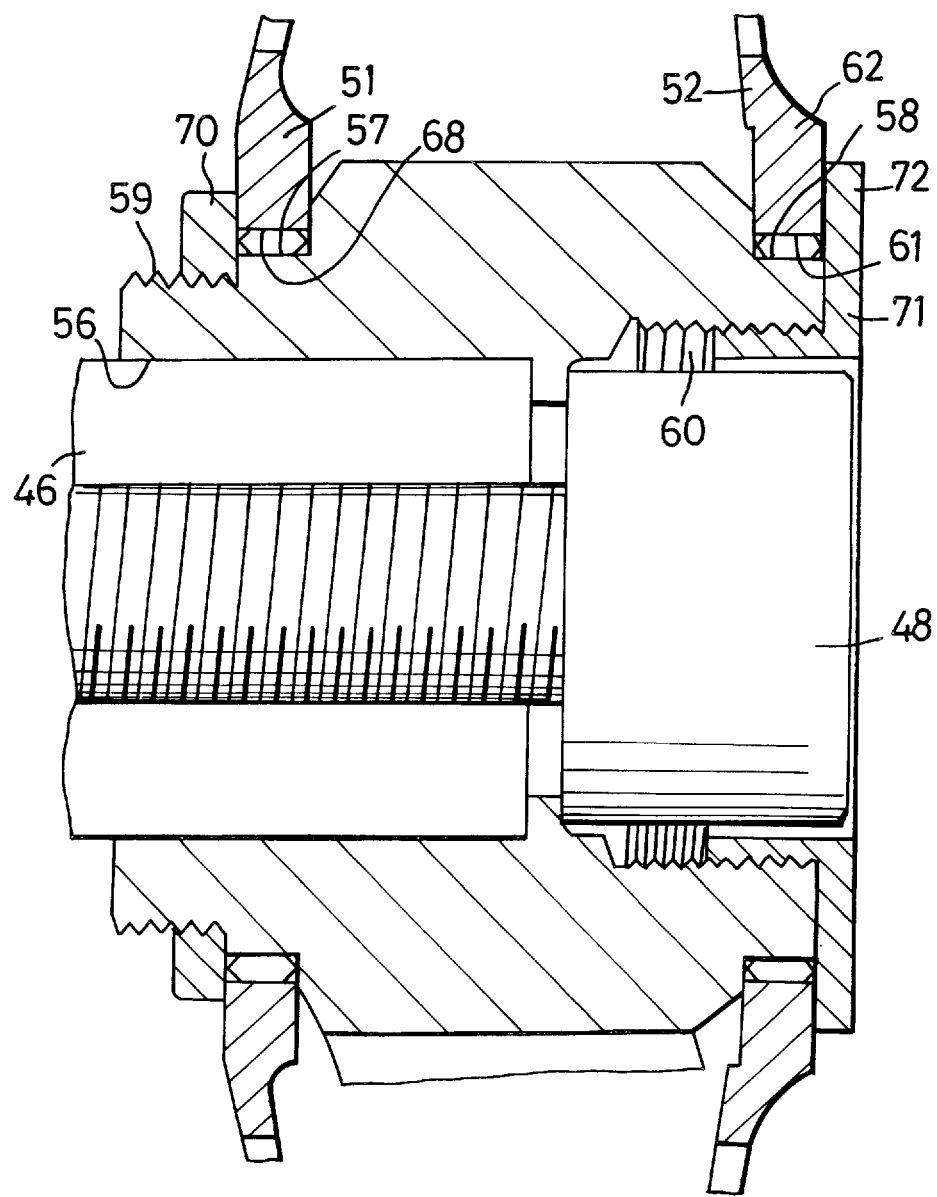
FIG. 5 is a detailed cross sectional view of the boss portion of the crankset shown in FIG. 2.

The crank arm 50 is a rod shaped member and extends radially outward across the reinforcement plate 52. The crank arm 50 is equipped with a boss member 55 at its basal end for attaching the crank axle 46, and a screw hole (not illustrated) at its distal end for attaching the pedal 40. The boss member 55 is a substantially cylindrical member, and as shown in FIG. 5, a square bore hole 56 is formed in its center area for mounting the crank axle 46. In addition, the peripheral surface of each end of the boss member 55 is provided with splines 57 and 58 for attaching the chainring retainer plate 51 and the reinforcement plate 52. The outside perimeter of the boss member 55 inwardly of splines 57 is provided with a threaded surface 59 for fastening the chainring retainer plate 51, and the inside perimeter of the boss member 55 on the outward side is provided with a threaded surface 60 for fastening the reinforcement plate 52.

Figure 4:
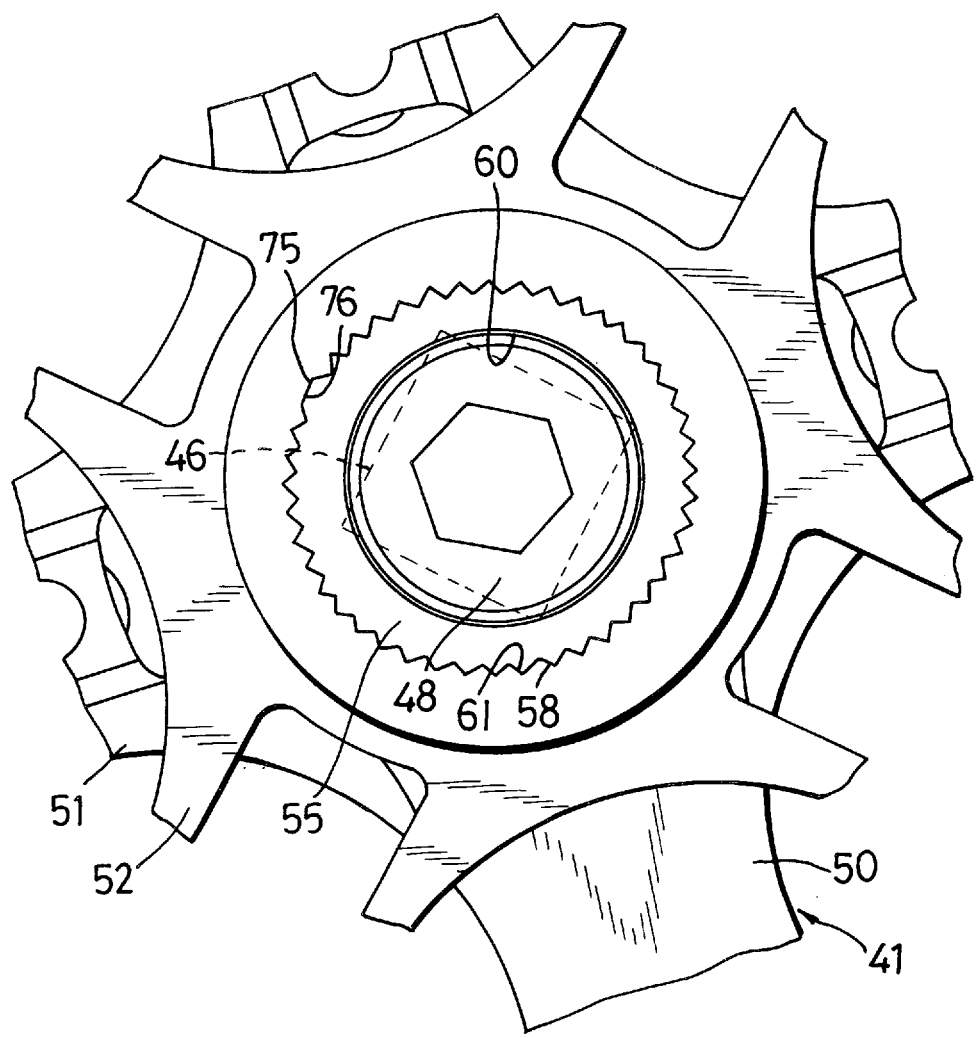
FIG. 4 is a front cross sectional view of the crankset shown in FIG. 2.

The reinforcement plate 52 is a light alloy planar member having a dish-shape, and as shown in FIGS. 2 and 3, it is provided with a center ring section 62, spider arms 63 that radiate in the shape of a cross from the center ring section 62 and whose center area is cutout, and a peripheral ring section 64 formed at the distal ends of the spider arms 63. The reinforcement plate 52 is fastened to the boss member 55 by means of a hollow metal fastener 71 equipped with a double-chamfered flange 72 that is screwed into the female screw member 60. As shown in FIG. 4, the center member of the center ring section 62 is equipped with splines 61 which mesh with the splines 58. Moreover, the reinforcement plate 52 has elasticity and, in its attached state, biases the chainring retainer plate 51 inwardly.

The chainring retainer plate 51 is a light alloy planar member having a dish shape and, like the reinforcement plate 52, is provided with a center ring section 65, spider arms 66, and a peripheral ring section 67. The chainring retainer plate 51 is attached to the boss member 55 by means of a ring-shaped metal fastener 70 that screws onto the threaded surface 59. The spider arms 66 of the chainring retainer plate 51 are offset by a half-pitch with respect to the spider arms 63 of the reinforcement plate 52. The peripheral ring section 67 of the chainring retainer plate 51 is fastened to the perimetric ring member 64 of the reinforcement plate, together with the outer chainring 43, by means of a bolt 69. The center portion of the center ring section 65 is provided with splines 68 that mesh with the splines 57 in the same manner as splines 61 and 58, shown more specifically in FIG. 4. Retainer members 73 and 74 for attaching the middle chainring 44 and the inner chainring 45 are formed on the spider arms 66 of the chainring retainer plate 51 on two circles each having a different radius.

As shown in FIG. 4, the boss splines 58 and the splines 61 of the reinforcement plate 52 are provided with inner teeth 75 and outer teeth 76 for positioning the components in the circumferential direction. The widths of inner teeth 75 and outer teeth 76 differ from the remaining splines so that inner teeth 75 mesh only with the positioning outer teeth 76. In addition, similar inner and outer teeth for positioning are formed with the boss splines 57 and splines 68 on the chainring retainer plate 51. This positioning in the circumferential direction allows the spider arms 63 of the reinforcement plate 52 to be offset by a half-pitch with respect to the spider arms 66 of the chainring retainer plate 51.

The crankset 31 described above is assembled in the following manner. First, the middle chainring 44 and the inner chainring 45 are attached to the chainring retainer plate 51. The chainring retainer plate 51 is then installed on the boss member 55 of the crank arm 50 by means of the inner and outer positioning teeth and positioned in the circumferential direction such that the splines 68 and the splines 57 are engaged. This is followed by screwing the metal fastener 70 into the male screw member 59 in order to fasten the chainring retainer plate 51 to the boss member 55.

Subsequent to fastening the chainring plate 51 to the boss member 55, the crank arm 50 is crossed in-between spider arms 63, and the reinforcement plate 52 is positioned opposite the chainring retainer plate 51. The reinforcement plate 52 is positioned using the positioning inner teeth 75 and the positioning outer teeth 76 so that its spider arms 63 are positioned opposite the spider arms 66 of the chainring retainer plate 51 but offset by a half-pitch. Lighter weight with good balance is thus obtained as a result of offsetting the spider arms by a half-pitch with respect to each other. The peripheral ring section 64 of the reinforcement plate 52 is then fastened to the peripheral ring section 67 of the chainring retainer plate 51 by means of a bolt 69. The outer chainring 43 is also fastened at this time. In this condition, the center ring section 62 of the reinforcement plate 52 is located towards the outside of the boss member 55 (the right side in FIG. 3) without actually being mounted to the boss member 55. In the final step, the metal fastener 71 is screwed into the female screw member 60 so that the center ring section 62 of the reinforcement plate 52 is pushed towards the left side in FIG. 3, causing the splines 61 to mesh with the splines 58 of the boss member 55, thus fastening the reinforcement plate 52 to the boss member 55.

When installing the right crank 41 and the left crank to a bicycle, the bottom bracket 47 which rotatably supports the crank axle 46 is first screwed into the bottom bracket shell 19. Following installation of the bottom bracket 47, the right crank 41 and the left crank are fastened to the crank axle 46 with bolts having hexagonal bores.

The chainrings 43 through 45 are each attached to the right crank 41 by means of the planar chainring retainer plate 51. Attachment of the planar reinforcement plate 52, which has been fastened to the perimeter of the chainring retainer plate 51, ensures strength and rigidity, and the planar chainring retainer plate 51 and reinforcement plate 52 enable lighter weight cranks to be used.

Figure 6:
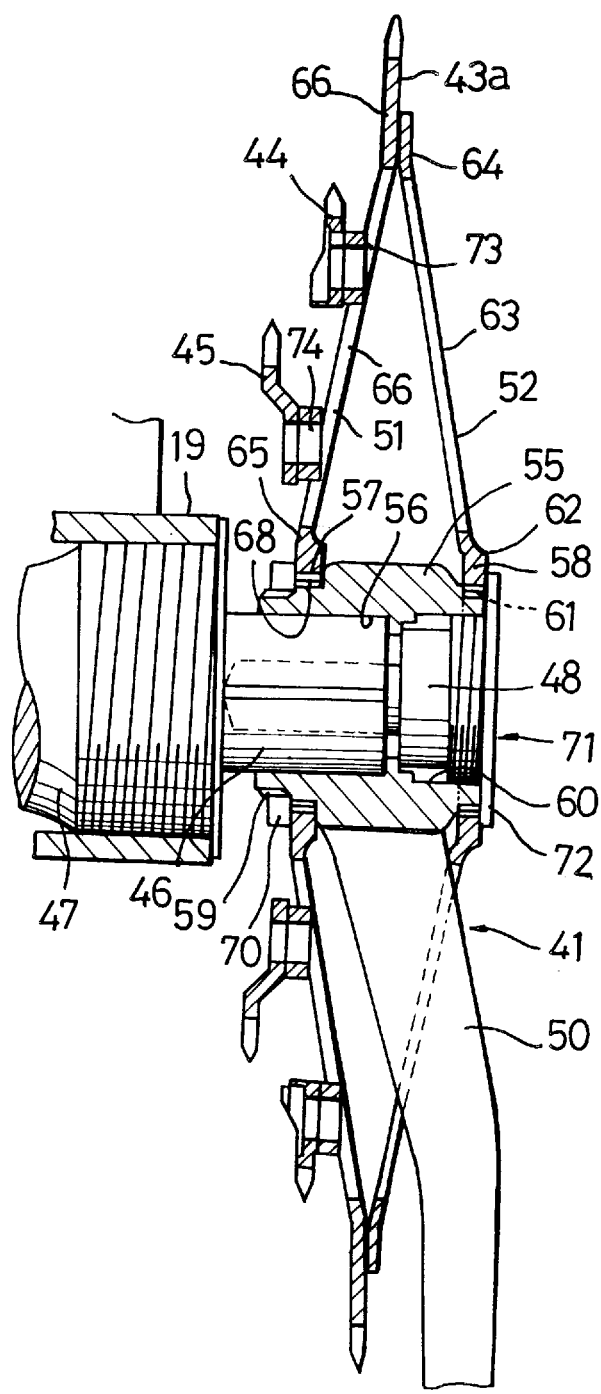
FIG. 6 is a side cross sectional view of an alternative embodiment of a crankset according to the present invention.
Figure 7:
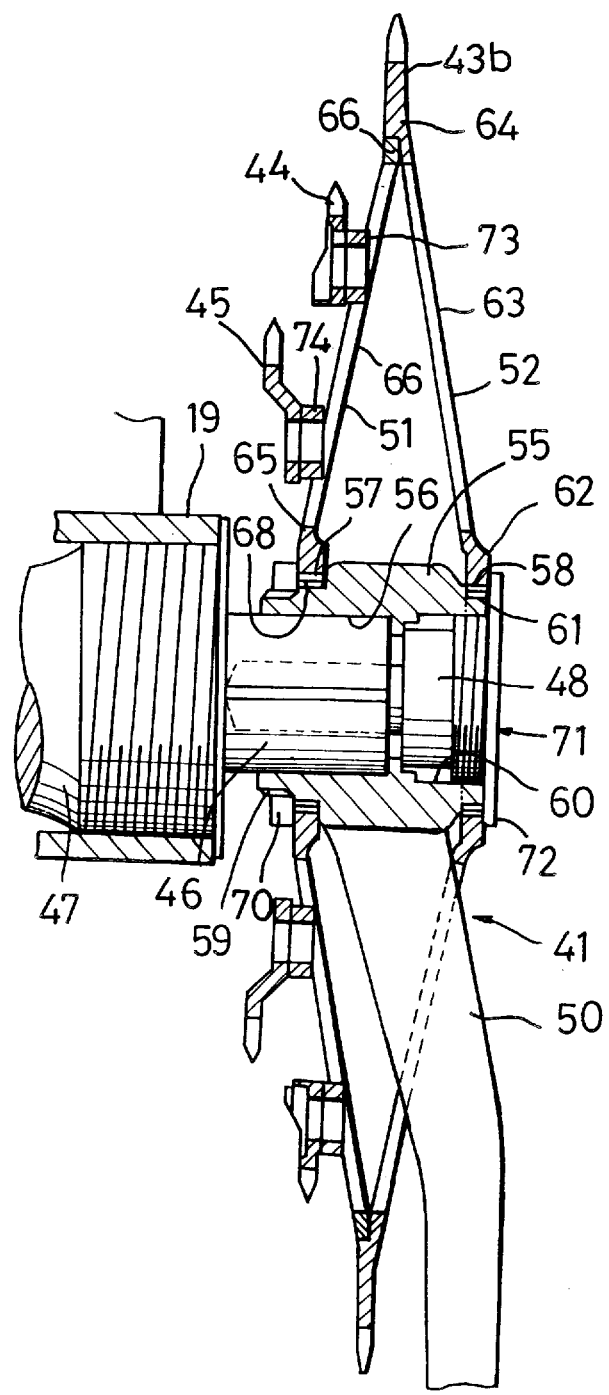
FIG. 7 is a side cross sectional view of another alternative embodiment of a crankset according to the present invention.
Figure 8:
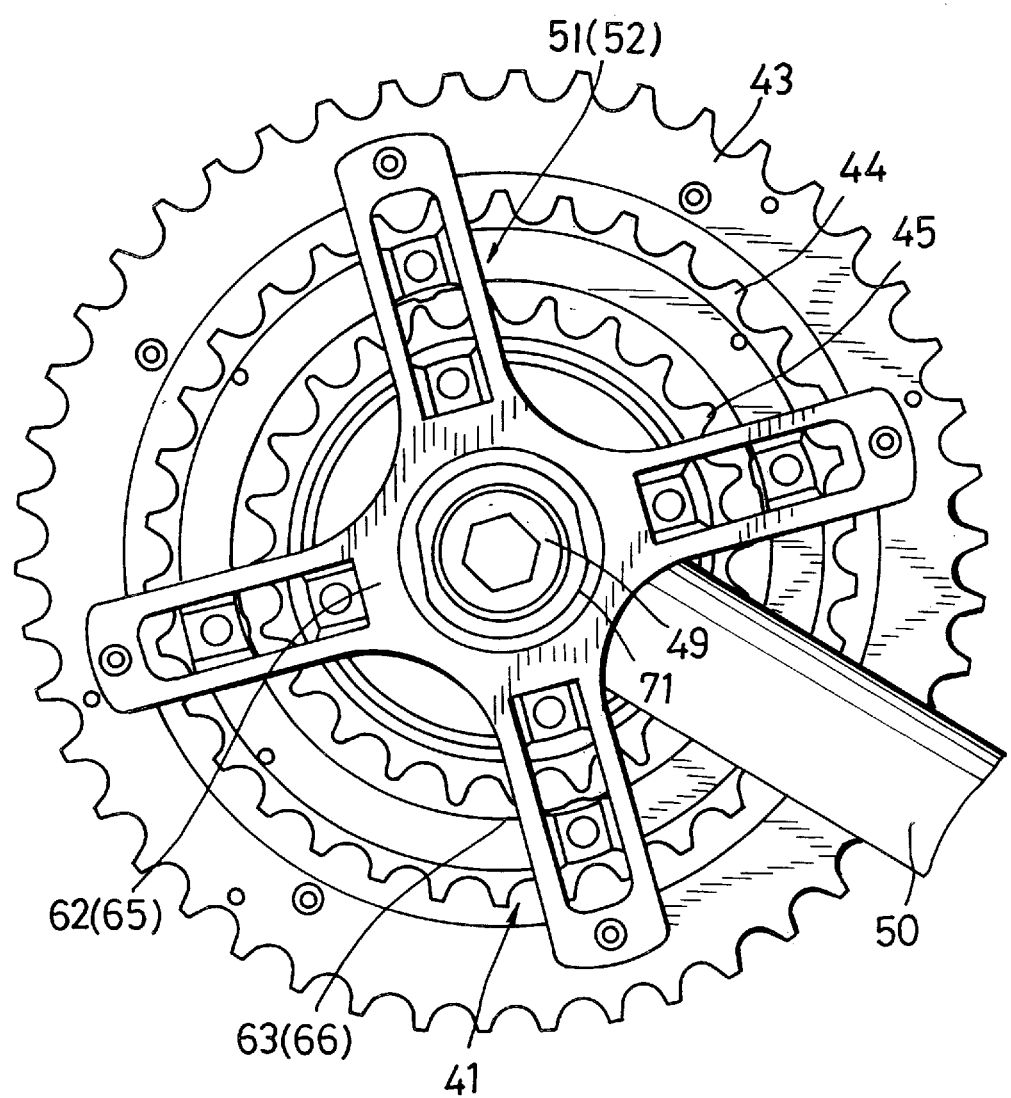
FIG. 8 is a front view of another alternative embodiment of a crankset according to the present invention.

While the above is a description of various embodiments of the present invention, further modifications may be employed without departing from the spirit and scope of the present invention. For example, FIG. 6 shows a different configuration in which the separate outer chainring 43 is replaced by forming the outer chainring teeth 43a on the peripheral edge of the chainring retainer member 51. FIG. 7 shows one in which it is replaced by forming outer chainring teeth 43b on the peripheral edge of the reinforcement plate 52. Such configurations can lead to reductions in number of parts as well as in assembly costs. FIG. 8 shows another possible configuration where the peripheral ring sections are not provided to the chainring retainer plate 51 or the reinforcement plate 52, but only spider arms 63 and 66 are provided. The spider arms 63 and 66 are arranged facing each other, and the outer chainring 43 may be attached towards the inside of the spider arms 63 and 66. Such a configuration can lead to further weight reductions. Designs can be employed where the chainring retainer plate 51 and the reinforcement member 52 are not fabricated from light alloys, but as planar members fabricated from light synthetic resins or fabric-reinforced resins (FRP or CFRP). Such configurations can lead to further weight reductions.

Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A bicycle crankset for mounting a chainring (43,44,45), the crankset comprising:
   a crank arm (50) having a first end for mounting a pedal (40) and a second end having a boss (55) for mounting to a crank axle (46);
   a chainring retainer (51) for supporting the chainring (43,44,45), wherein the chainring retainer includes:
      a first engagement member (68) for engaging the boss (55); and
      an elongated retainer intermediate member (66) extending radially outwardly from the first engagement member (68) to a retainer intermediate member outer peripheral section;
   a reinforcement member (52) including:
      a second engagement member (61) laterally spaced apart from the first engagement member (68) for engaging the boss (55); and
      an elongated reinforcement intermediate member (63) extending radially outwardly from the second engagement member (61) to a reinforcement intermediate member outer peripheral section;
   wherein the retainer intermediate member outer peripheral section is attached to the reinforcement intermediate member outer peripheral section so that both the retainer intermediate member outer peripheral section and the reinforcement intermediate member outer peripheral section are laterally aligned between the first engagement member (68) and the second engagement member (61).

2. The crankset according to claim 1 wherein the first engagement member (68) is structured for engaging a first outer peripheral surface (57) of the boss (55), and wherein the second engagement member (61) is structured for engaging a second outer peripheral surface (58) of the boss (55).

3. The crankset according to claim 1 wherein the chainring retainer (51) has a plate shape, and wherein the reinforcement member (52) has a plate shape.

4. The crankset according to claim 1 wherein the chainring retainer (51) is structured to support an outer chainring (43), a middle chainring (44) and an inner chainring (45).

5. The crankset according to claim 1 wherein the chainring retainer (51) is structured to support an inner chainring (45) and a middle chainring (44), and wherein an outer peripheral edge of the reinforcement member (52) comprises a plurality of sprocket teeth (43b).

6. The crankset according to claim 1 wherein the chainring retainer (51) is structured to support an inner chainring (45) and a middle chainring (44), and wherein an outer peripheral edge of the chainring retainer (51) comprises a plurality of sprocket teeth (43a).

7. The crankset according to claim 1 wherein the chainring retainer (51) includes a first peripheral ring (67) disposed at the retainer intermediate member outer peripheral section, and wherein the section (64) of the reinforcement member (52) comprises a second peripheral ring disposed at the reinforcement intermediate member outer peripheral section and fastened to the first peripheral ring (67).

8. The crankset according to claim 7 wherein the first engagement member (68) comprises a plurality of splines disposed on an inner surface of a first center section (65) of the chainring retainer (51) for engaging a plurality of first splines (57) on a first outer peripheral surface of the boss (55), and wherein the second engagement member (61) comprises a plurality of splines disposed on an inner surface of a second center section (62) of the reinforcement member (52) for engaging a plurality of second splines (58) on a second outer peripheral surface of the boss (55).

9. The crankset according to claim 1 wherein the chainring retainer (51) comprises:
   a first center ring (65) having the first engagement member (68); and
   a plurality of first arms (66) extending radially outwardly from the first center ring (65); and
   wherein the reinforcement member (52) comprises:
      a second center ring (62) having the second engagement member (61); and
      a plurality of second arms (63) extending radially outwardly from the second center ring (62); and
   wherein distal ends of the plurality of first arms (66) are connected to corresponding distal ends of the plurality of second arms (63).

10. The crankset according to claim 9 wherein the plurality of first arms (66) extend obliquely relative to the plurality of second arms (63).

11. The crankset according to claim 1 wherein the chainring retainer (51) comprises:
   a first center ring (65) having the first engagement member (68);
   a plurality of first arms (66) extending radially outwardly from the first center ring (65); and
   a first peripheral ring (67) disposed at distal ends of the plurality of first arms (66); and
   wherein the reinforcement member (52) comprises:
      a second center ring (62) having the second engagement member (61);
      a plurality of second arms (63) extending radially outwardly from the second center ring (62); and
      a second peripheral ring (64) disposed at distal ends of the plurality of second arms (63), wherein the second peripheral ring (64) forms the section of the reinforcement member (52) fastened to the chainring retainer (51), and wherein the second peripheral ring (64) is fastened to the first peripheral ring (67).

12. The crankset according to claim 11 wherein the second peripheral ring (64) is fastened to the first peripheral ring (67) along an entire circumference thereof.

13. The crankset according to claim 11 wherein the plurality of first arms (66) are offset from the plurality of second arms (63) by a half-pitch in a circumferential direction.

14. The crankset according to claim 11 wherein the first center ring (65) is spaced apart from the second center ring (62).

15. The crankset according to claim 14 wherein the first center ring (65) comprises a plurality of splines disposed on an inner surface thereof forming the first engagement member (68) for engaging a plurality of first splines (57) on a first outer peripheral surface of the boss (55), and wherein the second center ring (62) comprises a plurality of splines disposed on an inner surface thereof forming the second engagement member (61) for engaging a plurality of second splines (58) on a second outer peripheral surface of the boss (55).

16. The crankset according to claim 15 further comprising:

a first fastener (70) for engaging a first threaded surface (59) of the boss (55) for retaining the chainring retainer (51) to the boss (55); and a second fastener (71) for engaging a second threaded surface (60) of the boss (55) for retaining the reinforcement member (52) to the boss (55).

17. The crankset according to claim 1 wherein at least one of the chainring retainer (51) and the reinforcement member (52) are formed from a synthetic resin.

18. The crankset according to claim 1 wherein the retainer intermediate member (66) extends obliquely relative to the reinforcement intermediate member (63).

19. The crankset according to claim 1 wherein the retainer intermediate member outer peripheral section and the reinforcement intermediate member outer peripheral section are laterally aligned within a space defined by and between the first engagement member (68) and the second engagement member (61).

20. The crankset according to claim 11 wherein the plurality of first arms (66) extend obliquely relative to the plurality of second arms (63).

21. The crankset according to claim 1 wherein the first engagement member (68) and the retainer intermediate member (66) are formed as one piece, and wherein the second engagement member (61) and the reinforcement intermediate member (63) are formed as one piece.

* * * * *